Patented Apr. 26, 1938

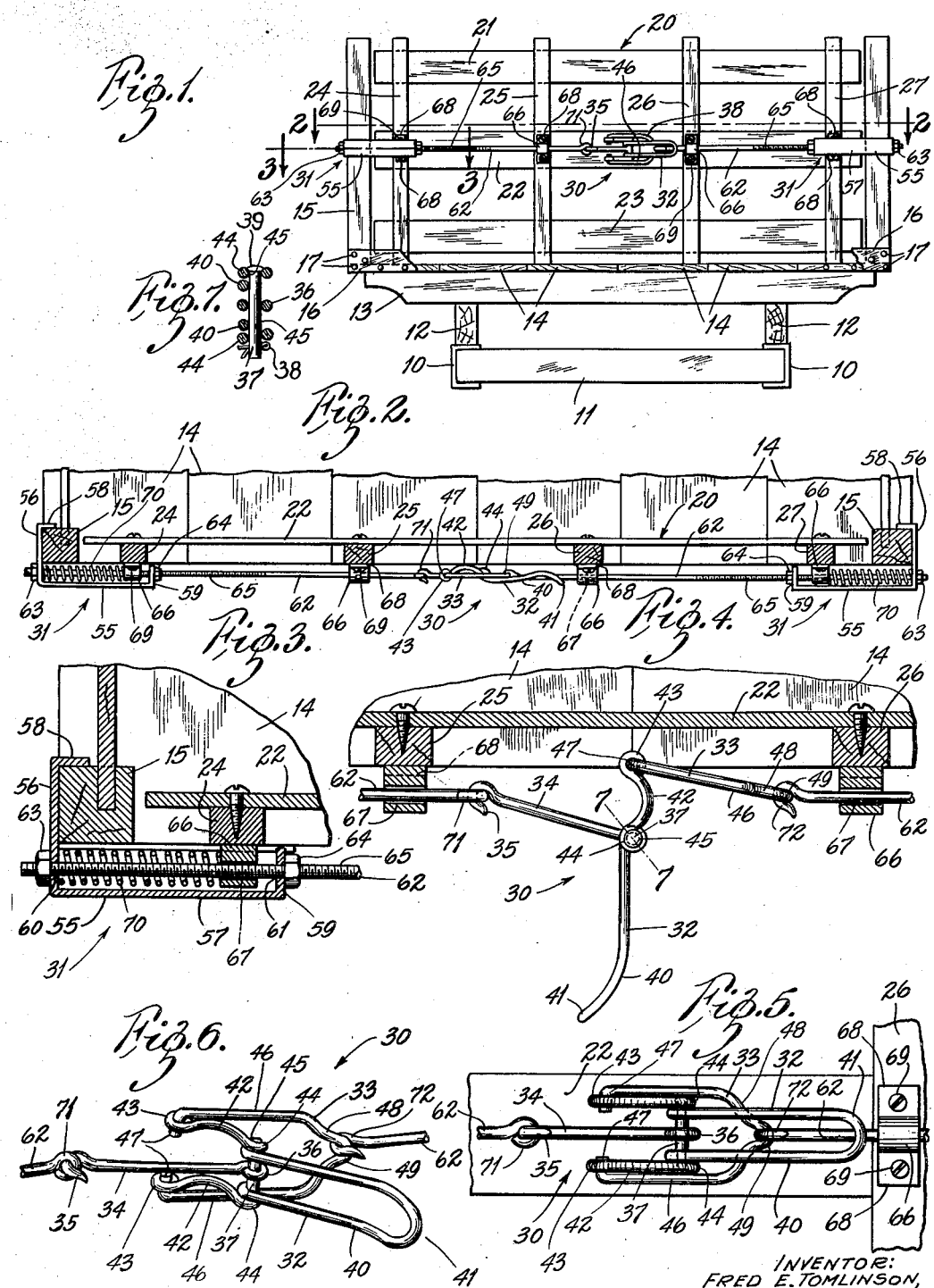
April 26, 1938. F. E. TOMLINSON 2,115,241
ENDGATE FASTENER
Filed Aug. 3, 1936
INVENTOR:
FRED E. TOMLINSON,
By Lawrence B. Hingeland
ATTORNEY.

2,115,241

UNITED STATES PATENT OFFICE 2,115,241

ENDGATE FASTENER

Fred Everet Tomlinson, Grove, Okla., assignor of one-half to Harlan Link Kelley, Grove, Okla.

Application August 3, 1936, Serial No. 93,924

5 Claims. (Cl. 292—26)

The present invention relates generally to fastening devices, and more particularly to an end gate fastening device, which includes a removable over-center closure assemblage.

An object of the present invention is to provide a fastening device for end gates of trucks, and the like.

Another object is to provide an end gate fastener which includes spring-influenced corner post grasping units, and a removable unitary over-center lever assemblage.

Another object is to provide an over-center lever assemblage which includes a resilient portion adapted to compensate for and eliminate that small amount of slack which conventional devices now in use leave.

Another object is to provide an end gate fastener which is economical to manufacture, simple in operation, and suitable for a wide range of installation.

Other objects and advantages will be apparent from the following description, taken in conjunction with the accompanying drawing, in which Fig. 1 is a rear view of a portion of a truck showing a preferred embodiment of the present invention installed upon one type of end gate and securing it in operative position at the back of the truck.

Fig. 2 is a section on the line 2—2 of Fig. 1.

Fig. 3 is a section on the line 3—3 of Fig. 1.

Fig. 4 is a view of the removable lever assemblage and associated parts showing the relation of the elements when the device is partially closed.

Fig. 5 is another view of the lever assemblage and associated parts showing the relation of the elements when the device is in closed position.

Fig. 6 is a perspective of the lever assemblage showing the details of its elements.

Fig. 7 is a section on the line 7—7 of Fig. 4.

Referring to the drawing more particularly by reference numerals, there are shown in Fig. 1 certain elements of a truck including chassis channels 10 having a transverse brace 11 extending therebetween, vertically disposed supports 12, a transverse floor support 13, floor boards 14, rear corner posts 15, and reinforcing plates 16 secured by bolts 17, or the like, to the posts 15 and floor boards 14.

A skeleton end gate generally designated 20 is provided and includes horizontal members 21, 22 and 23 and vertical members 24, 25, 26 and 27. The horizontal and vertical members are securely connected together in any desired manner. The particular type of truck and end gate construction forms no part of the present invention and it is, of course, obvious that any type is adapted to receive the end gate fastener which is described below.

In a preferred embodiment, the present end gate fastener includes a centrally located lever assemblage generally designated 30 and end assemblages generally designated 31. The lever assemblage includes a U-shaped lever generally designated 32, a U-shaped member generally designated 33, a straight member or link 34 having a hook 35 at one end and an eye 36 at the other end, and a pivot pin 37. The pin 37 has a head 39 at one end and is apertured at the other end to receive a cotter pin 38. The lever 32 includes a handle portion 40 which is curved towards the extreme end to offset the bight 41 of the U from the general plane of the member, as can be readily seen from an inspection of Fig. 4. The lever 32 further includes the curved leg portions 42, each of which terminates in an eye 43. The handle portion 40 and the leg portions 42 are constructed of a continuous piece of resilient steel, or other suitable material, the legs 42 being joined to the handle 40 by the coiled portions 44, each of which defines an aperture 45. The U-shaped member 33 includes legs 46, each of which terminates at the free end in a right angular extension 47, and a bight 48 having a central depression 49 therein. The lever 32 is of a length in the curved portions 42 and the handle 40 to provide, respectively, sufficient spring and an operating arm long enough to insure easy operation of an instant assemblage.

The assemblying of the above described elements of the lever assemblage 30 is evident from an inspection of Fig. 6. The pin 37 is inserted through one aperture 45, the eye 36, and the other aperture 45. The longitudinal dimension of the pin 37 is just sufficient to accommodate the coiled portions 44 and the eye 36 without binding, yet without looseness of the link 34 between the lever 32 to prevent side play of the device. The extensions 47 are inserted through the eyes 43 by the usual method of springing the legs 46 of the U-member 33 outwardly, the return spring being sufficient to maintain the extensions in place in the eyes 43.

Referring now to the end assemblages, one only will be described, inasmuch as the two are identical, except for one feature, which will be pointed out. There is provided a bracket generally designated 55 having two sides 56 and 57 which terminate in right angular extensions 58 and 59, respectively. The side 56 and the extension 59 have apertures 60 and 61, respectively, therethrough. An elongated rod 62 extends through the apertures 60 and 61 and is maintained in a selected position relative to the bracket 55 by nuts 63 and 64 which engage threads 65 of the rod 62 and abut against the side 56 and the extension 59, respectively. The rod 62 is threaded throughout a substantial portion of its length in order to allow for a wide range of adjustment.

An attaching clip 66 is disposed around the rod 62 between the side 56 and the extension 59. As disclosed, the clip 66 includes an apertured central portion 67 and attaching wings 68 which have holes therethrough for the reception of screws 69, or the like. A conventional type of clip constructed of strap metal may be employed, if desired. A helical spring 70 surrounds the rod 62 and abuts the inner face of the side 56 at the one end and the clip 66 at the other end. One of the rods 62 terminates in an eye 71, while the other rod 62 terminates in a hook 72, this being the only difference between the end assemblages.

In Figs. 1 and 2, the assembled end gate fastener is shown in position on an end gate. The clips 66 are fastened by the screws 69, or the like, to the vertical members 24 and 27. Additional clips 66 embrace the rods 62 near their free ends and are fastened to the vertical members 25 and 26.

Operation

The operation of the present invention is readily apparent from the foregoing, read in conjunction with an inspection of the drawing. In Fig. 2, the present end gate fastener is shown as maintaining the end gate 20 in position at the rear of the truck. The elements of the lever assemblage 30 are maintained in closed relation through an over-center position of the free ends of the lever 32. This action is so strong that chance of accidental release is very remote, obviating the use of additional fastening means. To remove the gate 20, the handle 40 of the lever assemblage 30 is grasped and rotated clockwise about the pivot pin 37 as a movable axis (Fig. 4). Clockwise movement of the handle 40 moves the extensions 47 through a longitudinal distance equal to twice the length of the leg portions 42 of the lever 32, which, obviously, allows the rods 62 to be withdrawn outwardly under the action of the springs 70. Each spring 70 will move its associated rod 62 and bracket 55 outwardly until the inner face of the extension 59 contacts the clip 66. This amount of movement is adjusted to permit the extension 58 to be moved outwardly a sufficient distance to clear the post 15, or other structure. The gate 20, with its associated fastener, may then be removed as an entirety from the back of the truck. Obviously, the reinstallation of the gate 20 upon the back of the truck comprises the above removal steps in reverse order.

It is thus apparent that there has been provided an end gate fastener which is adapted to achieve all of the objects and advantages sought. It is further apparent that there has been provided a lever assemblage which is capable of a variety of uses. It is to be understood that the above description and accompanying drawing have been given by way of illustration and example, and not by way of limitation, the invention being limited only by the following claims.

What is claimed is:

1. A fastening device comprising end assemblages and a connecting lever assemblage adapted to draw the end assemblages simultaneously towards each other, each of said end assemblages having a bracket of a configuration to grasp a fixed member, each of said end assemblages further having means for moving the assemblage outwardly to release the bracket from the fixed member upon the release of the lever assemblage, said lever assemblage including a U-shaped lever having two legs, a U-shaped member having two legs pivotally connected to the lever at the extremities of the four legs, a pivot pin connected to the legs of said lever intermediate the bight and the extremities of the legs, and a link having a hook at the free end thereof pivotally connected to said pin between the legs of the lever, the portions of the legs of the lever between the pin and the extremities being curved to afford a spring.

2. An end gate fastening device comprising end assemblages disposed for longitudinal movement, each of said assemblages including a bracket of a configuration to grasp a fixed member when in one position, locking means connecting the end assemblages adapted to hold the brackets in position grasping the fixed members, and spring means associated with each end assemblage adapted to move the bracket outwardly from engagement with its respective fixed member upon the release of the locking means, said locking means comprising an over-center lever assemblage, the actuating lever thereof including a curved resilient portion adapted to compensate for over-center slack.

3. An end gate fastening device comprising end assemblages disposed for longitudinal movement, and a lever assemblage connecting said end assemblages and being removable therefrom as a unit, each of said end assemblages including a bracket of a configuration to grasp a fixed member when in one position and an elongated rod adjustably fixed to said bracket and extending towards said lever assemblage, said lever assemblage comprising a U-shaped lever having two legs, a U-shaped member having two legs pivotally connected to the lever at the extremities of the four legs, a pivot pin connected to the legs of said lever intermediate the bight and the extremities of the legs, and a link having a hook at the free end thereof pivotally connected to said pin between the legs of the lever, the portions of the legs of the lever between the pin and the extremities being curved to afford a spring, one of said rods being connected to said hook and the other to the bight of the U-shaped member, whereby the lever is adapted to move the brackets into engagement with the fixed members.

4. A fastening device including an end assemblage, said end assemblage including an L-shaped bracket the long leg of which has an inwardly turned flange disposed to parallel the short leg, an elongated rod extending through aligned apertures in the flange and in the short leg and adjustably fixed relative thereto, a helical spring about said rod between said flange and short leg, and a mounting clip disposed about said rod between the flange and the spring.

5. An end gate fastener comprising a central lever assemblage and end assemblages, each of said end assemblages including an L-shaped bracket the long leg of which has an inwardly turned flange disposed to parallel the short leg, an elongated rod extending through aligned apertures in the flange and in the short leg and adjustably fixed relative thereto, a helical spring about said rod between said flange and short leg, and a mounting clip disposed about said rod between the flange and the spring.

FRED EVERET TOMLINSON.